United States Patent [19]

Huggins, Jr.

[11] Patent Number: 5,038,449
[45] Date of Patent: Aug. 13, 1991

[54] PISTON RING END GAP TOOL

[76] Inventor: John E. Huggins, Jr., 43 Kalish Ave., Enfield, Conn. 06082

[21] Appl. No.: 476,717

[22] Filed: Feb. 8, 1990

[51] Int. Cl.⁵ .............................................. B25B 27/14
[52] U.S. Cl. ...................................... 29/271; 33/601; 33/605; 81/176.1
[58] Field of Search ......................... 29/224, 270–272; 33/601, 605; 81/176.1, 487

[56] References Cited

U.S. PATENT DOCUMENTS

| | | | |
|---|---|---|---|
| 1,410,415 | 3/1922 | Shell | 81/176.1 |
| 1,566,083 | 12/1925 | Forslund | 33/601 |
| 1,830,855 | 11/1931 | Russell | 81/176.1 |
| 2,648,136 | 8/1953 | Lanigan | 33/605 |
| 3,083,449 | 4/1963 | Simmons | 29/275 |

Primary Examiner—J. J. Hartman
Attorney, Agent, or Firm—Fleit, Jacobson, Cohn, Price, Holman & Stern

[57] ABSTRACT

A tool for use in checking and filing the end gap of piston rings. The tool includes a cylindrical member having a shoulder adjacent one end thereof which will receive and seat a piston ring and position it at a predetermined depth below the deck of a bore in order to determine the end gap between the adjacent ends of a piston ring with the shoulder on the tool providing for accurate position of the piston ring at a given depth throughout the 360° circle of the piston ring. The tool includes a groove or channel formed therein by which the end gap can be filed to increase the end gap to the desired dimension. The tool enables the ring to be positioned in the cylinder and the end gap measured and the tool then is used to hold the ring when filing the ends. The slot or groove in the tool provides a guide for the file when filing the end gap.

5 Claims, 1 Drawing Sheet

U.S. Patent     Aug. 13, 1991     5,038,449
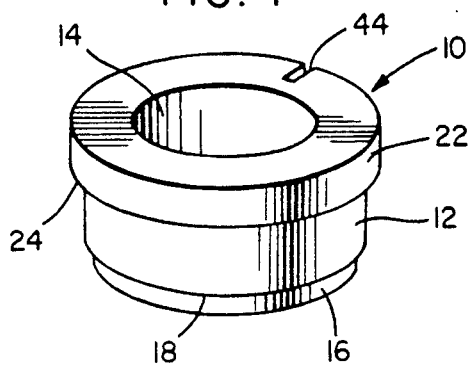
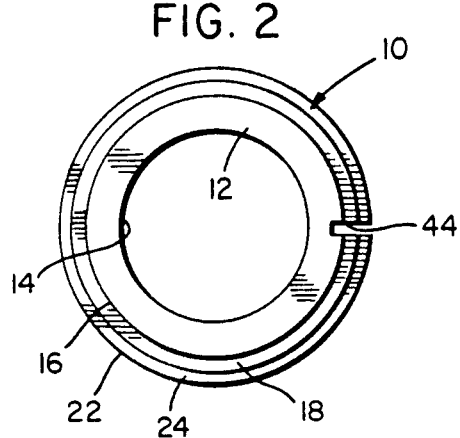
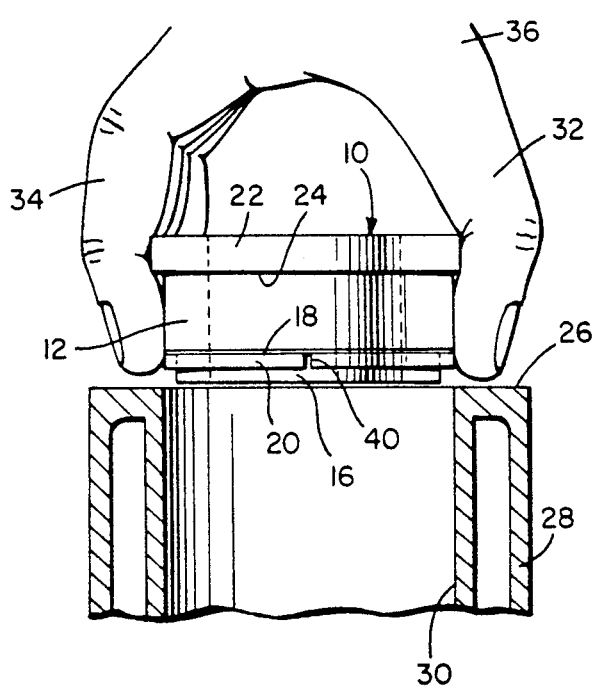
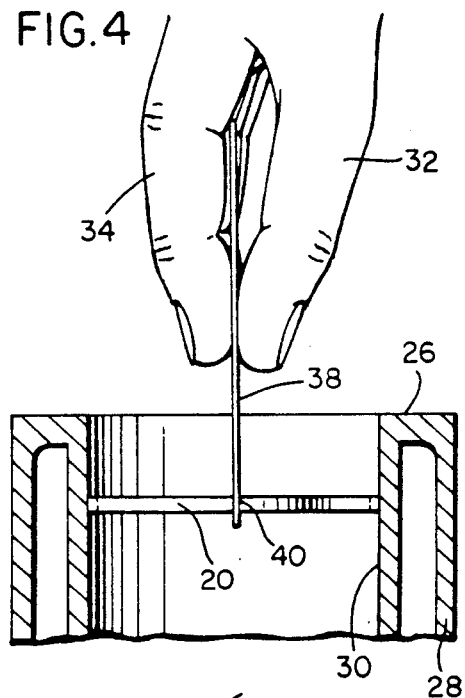
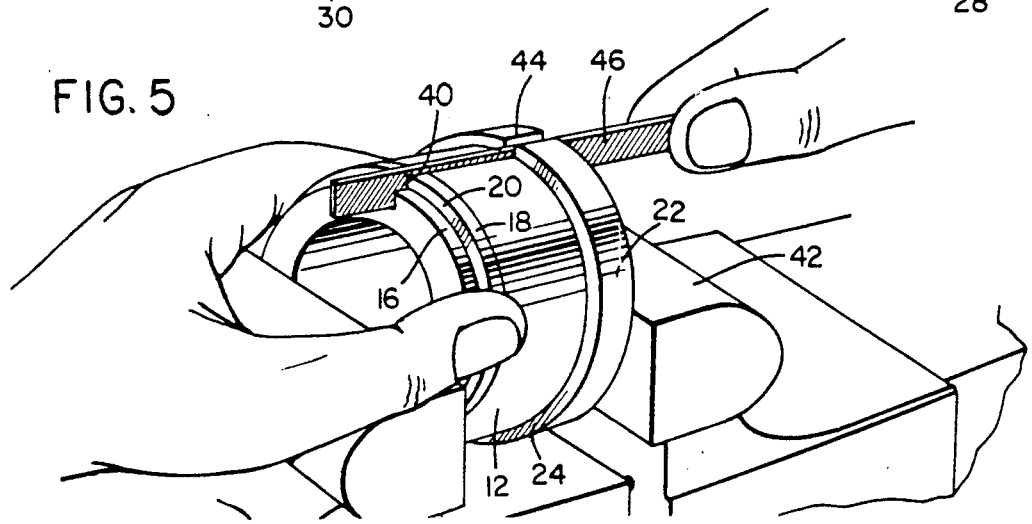

5,038,449

PISTON RING END GAP TOOL

BACKGROUND OF THE INVENTION

FIELD OF THE INVENTION

The present invention generally relates to a tool for use in checking and filing the end gap of piston rings. The tool includes a cylindrical member having a shoulder adjacent one end thereof which will receive and seat a piston ring and position it at a predetermined depth below the deck of a bore in order to determine the end gap between the adjacent ends of a piston ring with the shoulder on the tool providing for accurate position of the piston ring at a given depth throughout the 360° circle of the piston ring. The tool includes a groove or channel formed therein by which the end gap can be filed to increase the end gap to the desired dimension. The tool enables the ring to be positioned in the cylinder and the end gap measured and the tool then is used to hold the ring when filing the ends. The slot or groove in the tool provides a guide for the file when filing the end gap.

INFORMATION DISCLOSURE STATEMENT

Various tools have been provided to assist in the accurate formation of an end gap between the adjacent ends of a piston ring. The following U.S. Pat. Nos. relate to this field of endeavor:

1,410,415
1,566,083
1,830,855
2,648,136

These patents disclose piston ring compressers and other type structures to facilitate the filing of an end gap and also disclose a depth measuring tool. However, none of the above listed patents and none of the prior art discloses a single tool by which the ring can be positioned in the cylinder at an accurate depth throughout its extent with the tool subsequently being used to hold the ring when filing with the tool including a slot or groove in alignment with the end gap to receive a file in order to guide the file when filing the end gap.

SUMMARY OF THE INVENTION

An object of the present invention is to provide a piston ring end gap tool which will render it easy to check and file the end gap of piston rings to provide a precision end gap for the rings.

Another object of the invention is to provide a single tool to accurately position the piston ring at a predetermined point in the cylindrical bore of a cylinder with the tool then being removed to enable the end gap in the piston ring to be checked with a measuring instrument such as a feeler gauge with the piston ring then being removed and repositioned on the tool for filing the end gap to a predetermined precision dimension.

A further object of the invention is to provide a piston ring end gap tool as set forth in the preceding objects in which the tool is a cylindrical member having a shoulder adjacent one end to engage and receive the piston ring and a flange adjacent the other end to limit the insertion of the tool and the piston ring thereon into a cylindrical bore with the tool including a longitudinally extending slot or groove in the periphery thereof to enable the tool to hold and position the piston ring and guide a file while filing the end gap.

Still another object of the invention is to provide a tool in accordance with the preceding objects which is easy to use, effective to provide a precision fit for piston rings by accurately measuring the end gap and accurately filing the end gap so that the end gap will be a desired dimension.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the tool.

FIG. 2 is an end view of the tool.

FIG. 3 is an elevational view of the tool illustrating the manner in which it is used to position a piston ring in the bore of a cylinder at a predetermined depth below the top surface or deck of the cylinder.

FIG. 4 is an elevational view illustrating the piston ring positioned at the predetermined depth in the cylindrical bore with a feeler gauge being used to measure the end gap.

FIG. 5 is a perspective view of the tool being supported in a vise and used to accurately file the end surfaces of the piston ring to precision fit the piston ring to the bore with an appropriate end gap between the ends of the piston ring.

DESCRIPTION OF THE PREFERRED EMBODIMENT

Referring now specifically to the drawings, the piston ring end gap tool of the present invention is generally designated by reference numeral 10 and is in the form of a cylindrical body 12 having a hollow cylindrical interior 14 which extends therethrough. One end of the cylindrical body 12 is provided with a reduced diameter end portion 16 which forms a downwardly facing shoulder 18 thereon to receive a split piston ring 20 which engages the piston ring 20 when it is positioned on the reduced diameter lower end portion 16 as illustrated in FIG. 3. Adjacent the upper end of the cylindrical body 12, the tool 10 is provided with a peripheral flange 22 which forms a downwardly facing flange surface 24 which will engage the top surface or deck 26 of a block or cylinder structure 28 having a cylindrical bore 30 therein in order to position the piston ring 20 at a predetermined depth below the top surface 26 as illustrated in FIG. 4 with the piston ring 20 being square or parallel to the top surface 26 and perpendicular to the bore 30 with the ring 20 being accurately positioned throughout 360° of its length. When the piston ring 20 is positioned on the reduced diameter portion 16 against the shoulder 18, the thumb and fingers 32 and 34 of a person's hand 36 may squeeze the ring so that it will go into the cylindrical bore 30 and the tool then is lowered until the downwardly facing flange 24 engages the top surface 26. This accurately positions the piston ring at a predetermined depth in the bore 30 below the top surface or deck 26 as illustrated in FIG. 4 so that a feeler gauge 38 or similar measuring instrument may be used to measure the end gap, that is, the distance between adjacent ends of the split piston ring.

If the end gap 40 is too small, the tool 10 is then used to increase the end gap. The dimension of the end gap is determined by the feeler gauge 38 and the ring 20 is removed from the cylindrical bore 30 in order to file the adjacent ends. The tool 10 is positioned between the jaws of a vise 42 with a longitudinally extending groove or slot 44 in the external surface of the tool being disposed upwardly and the piston ring 20 positioned on the reduced diameter portion 16 as illustrated in FIG. 5. A file 46 is positioned in the slot or groove 44 and engaged with the end edges of the end gap 40 of the piston ring 20 and by exerting inward pressure and centering of the ring 20 by using the fingers and thumb, the file 46 may be guided during its reciprocatory movement to accurately grind or file the ends of the piston ring which form the end gap thereby increasing the dimension of the end gap to a desired dimension so that it can properly seal a reciprocating piston when positioned in the cylindrical bore 30.

This tool makes it easy to check and file the end gap 40 of piston rings 20 and is used as an aid in precision fitting a piston ring into a cylinder bore 30. The tool will set the piston ring squarely in the bore with the entire circumference of the piston ring being at an equal depth from the deck or top surface of the cylinder. After the ring has been positioned in the bore, the tool is removed and the piston ring 20 remains down inside the cylinder as illustrated in FIG. 4. The ring end gap is then checked with the feeler gauge 38 and if the ring gap is inadequate or too small, the tool is then used as a fixture to precision file the end gap. This is accomplished by the tool being put into a vise or other holding device with the machined slot or groove 44 facing upwardly and the piston ring positioned on the reduced diameter en portion 16 and held in centered position in relation to the slot or groove 44 and squeezed inwardly into contact with a file 46 which is also positioned in the slot or groove 44. The slot or groove 44 acts as a guide for the file and by centering the ring with your fingers and exerting inward pressure thereon, the end gap of the ring can be easily filed and increased in dimension. This process is repeated until the specified end gap is retained. Thus, a single tool has a dual purpose of setting the ring down into the cylinder bore at an equal depth thus creating accuracy of the actual end gap and then the tool serves as a fixture in order to easily file the ring end gap and accurately form the desired end gap within the required dimensions.

The tool enables both ends of the piston end gap to be filed simultaneously thus maintaining a precision fit of the piston ring and the process can be repeated as many times as required in order to obtain the specified end gap. The dimensions of the tool will vary for different cylindrical bores with the overall length of the device being substantially constant with the present invention including tool overall length of approximately 2" although this can be reduced or increased depending upon the requirements of the various uses.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A piston ring end gap tool for accurately positioning a piston ring in a cylindrical bore to enable the end gap to be accurately measured and holding the piston ring while filing the ends of a piston ring forming the end gap an equal amount on each end of the piston ring, said tool comprising a continuously cylindrical member of rigid one-piece construction and having a diameter to be closely received telescopically in the cylindrical bore, said tool including a reduced diameter lower end portion forming a seat for a piston ring with the inner end of the reduced diameter portion defining a shoulder engaging the piston ring to enable the piston ring to be moved downwardly into a cylindrical bore, said tool including a peripheral outwardly projecting flange defining a downwardly facing flange surface adjacent the upper end of the cylindrical member for limiting the downward movement of the piston ring into a cylindrical bore by engaging the end of the bore and accurately positioning the piston ring in the bore to enable the end gap of the piston ring to be accurately measured by a feeler gauge when the tool is removed from the bore with the piston ring left in the bore, said tool including end surfaces for engagement by a vise for mounting the tool and piston ring in a work position, said cylindrical member including means on the exterior surface guiding longitudinal movement of a file in engagement with the end surfaces of the piston ring to increase the end gap.

2. The structure as defined in claim 1 wherein said guide means is a longitudinally extending groove formed in the external surface of the cylindrical member to receive an elongated file and guide the file during reciprocation with the ends of the piston ring forming the end gap being aligned with the slot and receiving the file therebetween with inward pressure on the ends of the piston ring enabling the end gap to be increased by reciprocating the file.

3. The structure as defined in claim 2 wherein said cylindrical member includes a hollow interior, said slot extending in parallel relation to the longitudinal axis of the cylindrical member and having a bottom surface parallel to the internal surface of the hollow cylindrical member and extending throughout the length of the cylindrical member.

4. A tool for precision fitting a piston ring to a cylindrical bore comprising a continuously cylindrical body having an unchangeable predetermined outside dimension enabling insertion into the cylindrical bore, flange means on said body limiting insertion into the cylindrical bore, said body including an end portion spaced from said flange means, said end portion having a diameter less than the outside dimension of said body with a continuous shoulder formed at the juncture of the end portion with the body, said end portion receiving a piston ring thereon with the piston ring engaged with said shoulder when the ends of the ring are squeezed toward each other and the body with the piston ring thereon are inserted into the cylindrical bore, said shoulder being equally spaced from said flange means throughout the circumference of the shoulder to position the piston ring at a predetermined location in spaced relation to the end of the cylindrical bore when the flange means engages the end of the bore with the piston ring being equally spaced from the end of the cylindrical bore throughout the circumference thereof, the expansion of the piston ring in the bore after insertion retaining the piston ring in the predetermined location when the body is removed thereby enabling accurate measurement of the end gap in the piston ring while the piston ring is in the predetermined location in the cylindrical bore, and means located on the exterior surface of the body for guiding longitudinal movement of a file relative to said piston ring.

5. The structure as defined in claim 4 wherein said body includes means engaged by a work holding fixture with the piston ring mounted on the end portion thereof, said body including a longitudinally extending groove formed therein for guidingly receiving a file for filing the ends of the piston ring when the piston ring end gap is aligned with the groove and the piston ring is squeezed to urge the ends of the piston ring into engagement with opposed surfaces of the file with reciprocation of the file in the groove removing material from the ends of the piston ring to increase the end gap.

* * * * *